April 7, 1925.                                                1,532,680
H. A. BROWN ET AL
METHOD OF SUPPLYING CURRENT FOR ARC WELDING AND APPARATUS THEREFOR
Filed Nov. 12, 1920
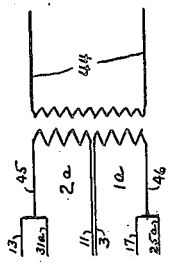
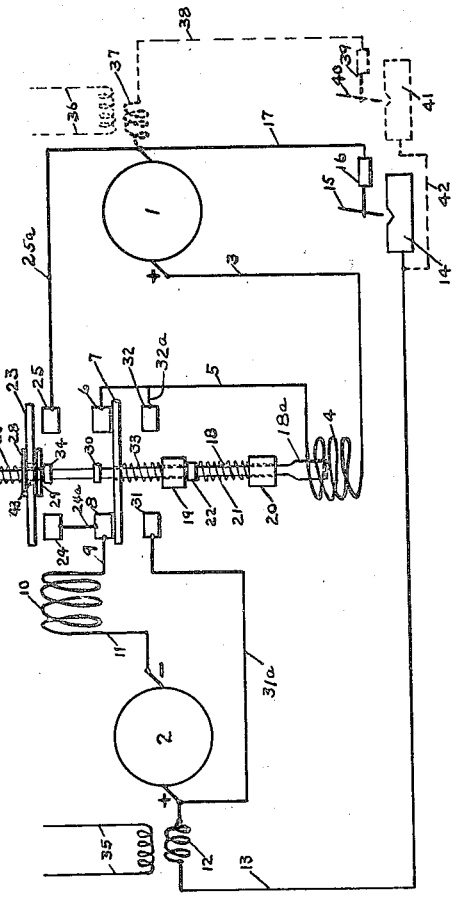
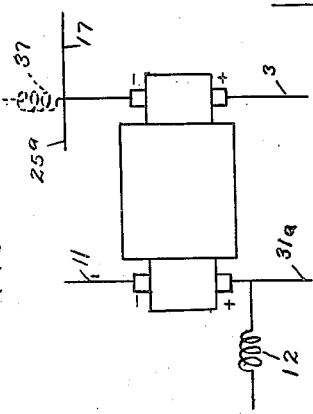
Inventors:—
Hugh A. Brown
& Alan M. Bennett
By [signature]
Attorney Patented Apr. 7, 1925.

1,532,680

UNITED STATES PATENT OFFICE.

HUGH A. BROWN AND ALAN M. BENNETT, OF ERIE, PENNSYLVANIA.

METHOD OF SUPPLYING CURRENT FOR ARC WELDING AND APPARATUS THEREFOR.

Application filed November 12, 1920. Serial No. 423,547.

*To all whom it may concern:*

Be it known that we, HUGH A. BROWN and ALAN M. BENNETT, citizens of the United States, residing at Erie, in the county of Erie and State of Pennsylvania, have invented new and useful Improvements in Methods of Supplying Current for Arc Welding and Apparatus Therefor, of which the following is a specification.

In the use of arc welding devices it is desirable to have a high voltage to strike the arc. After the arc is formed the voltage may be very much reduced without interfering with its operation and by reducing the voltage the energy consumption may be very much reduced. This has been accomplished in the past by having a generator of sufficient capacity to continue the arc and also of sufficient capacity with the same method of generation to supply the necessary voltage to strike the arc, the change being accomplished by varying the fields. These former methods also involved difficulties at the commutator which required special treatment. With our device we arrange two sources of current from two generators. These may be combined in the same machine or may be separately arranged machines or sources of electrical energy supply. We operate these generators or sources of supply in series to effect the high voltage for striking the arc and after the arc has been formed continue the operation in multiple to supply the arc. In this way we are able to utilize a comparatively small machine or devices and obviate the difficulties heretofore expressed.

In carrying out our invention we automatically switch from the series connection to the multiple connection through devices energized by the welding current so that as soon as the arc is formed these devices change the connection automatically.

Drawings illustrate the apparatus forming part of our invention and with which our method may be used.

Fig. 1 shows a diagrammatic view in which the current is supplied from generators.

Fig. 2 an alternative construction in which the current is supplied from an outside source through transformers.

Fig. 3 shows a diagram of a preferred form of generator.

In the preferred construction shown in Fig. 1, 1 marks one generator and 2 the other generator, each having its separate commutator and preferably both being formed with the same rotating member and same fields. The wiring is as follows: A wire 3 leads from the generator 1 through a coil 4 which operates as an electro-magnet for operating the switches hereinafter described by way of a wire 5 to a stationary plate 6. A movable contact plate 7 operates in connection with the stationary plate 6 and a second plate 8 and bridges these two plates and completes the connection. A wire 9 extends from the plate 8 by way of a reactance coil 10 and then by a wire 11 to the generator 2, and from the generator 2 preferably through the field winding 12 of the generators by a wire 13 to a welding terminal 14. The reactance coil limits the flow of current at the moment of short circuit when contact is made between the electrode and the work. A pencil 15 operates from the holder 16 and a wire 17 returns from the electrode holder 16 to the generator 1. In this position of the switch formed with the plates 6 and 8 and the plate 7 the generators operate in series and high voltage is established capable of striking an arc and this is the initial position of the switches when the pencil is brought into arcing position.

A switch carrier 18 is slidingly mounted in bearings 19 and 20. A spring 21 is arranged on the carrier between the bearing 20 and a shoulder 22 and moves the carrier to bring the plate 7 into contact with the plates 6 and 8 when released, thus completing the series connection. The lower end of the carrier 18 is enlarged and forms a plunger 18ª for the electromagnet coil 4 so that as soon as the current is established in the electromagnet 4 it operates on the plunger thus moving the carrier downwardly and opening the series switch formed with the plates 6, 7 and 8. A movable switch plate 23 is also mounted on the carrier 18 and stationary plates 24 and 25 are in the path of the plate 23 as the carrier moves. A spring 26 is arranged on the carrier and operates against a shoulder 27 and an insulated mounting 28 above the plate 23. An insulated mounting 29 is also arranged below the plate 23. The carrier is free to slide through the mountings 28 and 29 so that after the plate 23 contacts the plates 24 and 25 the carrier 18 may continue to move, the spring 26 yielding for this purpose. As soon as the plate 23 bridges the plates 24 and 25 a short circuit is established, the wire 24ª connecting the plate 24 with the plate 8 and a wire 25ª connecting the plate 25 with the wire 17 but this is only momentary as the electro-magnet coil 4 operating as a reactance coil in the circuit affects a slight downward movement of the carrier 18 and shoulder 30 moving with the carrier 18 contacts the plate 7 and breaks the series connection between the contacts 6 and 8. It will be noted that the spring 33 maintains this contact even after the carrier 18 starts to move until the shoulder 30 reaches the plate 7. A further movement of the carrier brings the plate 7 into contact with the stationary plates 31 and 32 forming the second multiple connection, the plate 31 being connected by a wire 31ª with the generator 2 and the plate 32 being connected by a wire 32ª with the wire 5. As soon as the connection through the plates 31 and 32 is established current continues to pass through the coil 4 and holds the switches in this position thus continuing the current through the welding terminals but with the generators in multiple.

As soon as the circuit is broken by breaking the arc the electro-magnet ceases to act on the plunger 18ª and the spring 21 forces the carrier 18 upwardly bringing the parts to the initial position as shown in the drawing.

We prefer to add to the field winding 12 a winding 35, either self-excited or separately excited. This operates in connection with the series winding in the well known manner in controlling the voltage. It may be preferable, however, to change this winding as conditions may warrant.

We prefer to use a generator having two commutators, a single rotating member and single fields as shown in Fig. 3 but it will be understood that the generators may be entirely separate, and in the broadest embodiment of our invention may be any devices used as a source of supply. We have shown in the dotted lines a field 36 and 37 which may be utilized for the generator 1 if it is mounted as a separate unit. Where this is the case the wire would carry from the field 37 in series with a field from the generator 1 by way of a wire 38 to the holder 39, pencil 40, holder 41, and wire 42 to the wire 13.

In operation the pencil is brought into arc relation, the high voltage of the two generators in series assuring the striking of the arc. The current through the electro-magnet immediately operates upon the carrier and automatically throws the switches so as to break the series connection and close the two multiple connections so that the device continues in multiple.

In the alternative construction supply lines 44 lead to a transformer whose secondaries are indicated at 1ª and 2ª. The secondary 2ª leads directly to the wire 11 and through the wire 45 to the wires 13 and 31ª. The other secondary leads directly to the wire 3 and through the wire 46 to the wires 17 and 25ª. These work in multiple or in series and the method is carried out in the same manner and with the other parts of the apparatus as in the preferred form.

What we claim as new is:—

1. The method of arc welding which consists in joining two sources of electric supply in series to strike the arc and then continuing the current from said sources in multiple.

2. The method of arc welding which consists in joining two sources of electric supply in series to strike the arc, then continuing the current from said sources in multiple, and interposing two means of reactance in series when said sources of supply are in series and one in connection with each source of current when said sources of current are in multiple.

3. The method of arc welding which consists in introducing an electro-magnet in the welding circuit and utilizing the magnet for controlling the welding circuit and as a reactance in the welding circuit.

4. In an arc welding machine, the combination of two devices for supplying current; and means for connecting said devices in series to strike an arc and for automatically changing the series connection to a multiple connection when the arc is formed.

5. In an arc welding machine, the combination of two devices for supplying current; and means for connecting said devices in series to strike an arc and for automatically breaking the series connection and connecting the devices in multiple when the arc is formed, said means comprising an electro-magnet energized by the welding current.

6. In an arc welding machine, the combination of two devices having a single rotating member for supplying current; and means for connecting said devices in series to strike an arc and for automatically breaking the series connection and connecting the devices in multiple when the arc is formed.

7. In an arc welding machine, the combination of two devices for supplying current, said devices having a common field; and means for connecting said devices in series to strike an arc and for automatically breaking the series connection and connecting the devices in multiple when the arc is formed.

8. In an arc welding machine, the combination of two sources of electric supply; and switches for connecting said sources of supply in series to strike an arc and in multiple to continue the arc.

9. In an arc welding machine, the combination of two generators; and switches for connecting said generators in series to strike an arc and in multiple to continue the arc.

10. In an arc welding machine, the combination of an arc forming circuit; switches varying said circuit when the arc is formed; and an electro-magnet in the circuit controlling the switches by direct action.

11. In an arc welding machine, the combination of two sources of electric supply; switches for connecting said sources of supply in series to strike an arc and in multiple to continue the arc; and automatic means for throwing said switches.

12. In an arc welding machine, the combination of two generators; switches for connecting said generators in series to strike an arc and in multiple to continue the arc; and automatic means for throwing said switches.

13. In an arc welding machine, the combination of an arc forming circuit; switches varying said circuit when the arc is formed; an electro-magnet in the circuit controlling the switches, said electro-magnet acting as a reactance coil in the welding circuit.

14. In an arc welding machine, the combination of two generators; switches for connecting said generators in series to strike an arc and in multiple to continue the arc; and automatic means for throwing said switches comprising devices energized by the welding current.

15. In an arc welding machine, the combination of two generators having a single rotating member; switches for connecting said generators in series to strike an arc and in multiple to continue the arc; and automatic means for throwing said switches.

16. In an arc welding machine, the combination of two generators having a common field; switches for connecting said generators in series to strike an arc and in multiple to continue the arc; and automatic means for throwing said switches.

17. In an arc welding machine, the combination of two sources of electric supply; switches for connecting said sources of supply in series to strike an arc and in multiple to continue the arc; and a reactance coil for each source of supply, said coils being in series when the sources of supply are in series and one connected with each source of supply when the sources of supply are operating in multiple.

18. In an arc welding machine, the combination of two generators; switches for connecting said generators in series to strike an arc and in multiple to continue the arc; and a reactance coil for each generator, said coils being in series when the generators are in series and one connected with each generator when the generators are operating in multiple.

19. In an arc welding machine, the combination of two sources of electric supply; switches connecting said sources of supply in series to strike an arc and in multiple to continue the arc; and automatic means for throwing the switches, said switches operating in sequence to close the series connection and close one of the multiple connections prior to the opening of the series connection and then to open the series connection and close the second multiple connection.

20. In an arc welding machine, the combination of two generators; switches connecting said generators in series to strike an arc and in multiple to continue the arc; and automatic means for throwing the switches, said switches operating in sequence to close the series connection and to close one of the multiple connections prior to the opening of the series connection and then to open the series connection and close the second multiple connection.

21. In an arc welding machine, the combination of two sources of electric supply; switches connecting said sources of supply in series to strike an arc and in multiple to continue the arc; automatic means for throwing the switches, said switches operating in sequence to close the series connection and to close one of the multiple connections prior to the opening of the series connection and then to open the series connection and close the second multiple connection; and a reactance coil in the second of said multiple connections.

22. In an arc welding machine, the combination of two generators; switches connecting said generators in series to strike an arc and in multiple to continue the arc; automatic means for throwing the switches, said switches operating in sequence to close the series connection and to close one of the multiple connections prior to the opening of the series connection and then to open the series connection and close the second multiple connection; and a reactance coil in the second of said multiple connections.

23. In an arc welding machine, the combination of two sources of electric supply; switches connecting said sources of supply in series to strike an arc and in multiple to continue the arc; automatic means for throwing the switches, said switches operating in sequence to close the series connection and to close one of the multiple connections prior to the opening of the series connection and then to open the series connection and close the second multiple connection; and a reactance coil in each of the multiple connections, said reactance coils being in series when the sources of supply are in series.

24. In an arc welding machine, the combination of two generators; switches connecting said generators in series to strike an arc and in multiple to continue the arc; automatic means for throwing the switches, said switches operating in sequence to close the series connection and to close one of the multiple connections prior to the opening of the series connection and then to open the series connection and close the second multiple connection; and a reactance coil in each of the multiple connections, said reactance coils being in series when the generators are in series.

25. In an arc welding machine, the combination of two sources of electric supply; switches controlling the current from said sources of supply, said switches comprising a series connection and two multiple connections; a carrier; movable contact members for each connection; and an electro-magnet arranged in the circuit for actuating the carrier to open the series connection and close the multiple connections.

26. In an arc welding machine, the combination of two generators; switches controlling the current from said generators, said switches comprising a series connection and two multiple connections; a carrier; movable contact members for each connection; and an electro-magnet arranged in the circuit for actuating the carrier to open the series connection and close the multiple connections.

27. In an arc welding machine, the combination of two sources of electric supply; switches controlling the current from said sources of supply, said switches comprising a series connection and two multiple connections; movable contact members for each connection; and an electro-magnet arranged in the circuit for actuating the carrier to operate on the switches in sequence to close one of the multiple connections, open the series connection and close the second multiple connection.

28. In an arc welding machine, the combination of two generators; switches controlling the current from said generators, said switches comprising a series connection and two multiple connections; a carrier; movable contact members for each connection; and an electro-magnet arranged in the circuit for actuating the carrier to operate on the switches in sequence to close one of the multiple connections, open the series connection and close the second multiple connection.

29. In an arc welding machine, the combination of two generators, said generators having common fields; and switches for connecting said generators in series to strike an arc and in multiple to continue the arc.

In testimony whereof we have hereunto set our hands.

HUGH A. BROWN.
ALAN M. BENNETT.